Aug. 20, 1940.　　　D. HOPPENSTAND　　　2,212,422
BRAKE
Filed March 15, 1939

INVENTOR
David Hoppenstand
by his attorneys
Stebbins, Blenko & Parmelee

Patented Aug. 20, 1940

2,212,422

UNITED STATES PATENT OFFICE 2,212,422

BRAKE

David Hoppenstand, Pittsburgh, Pa.

Application March 15, 1939, Serial No. 261,951

4 Claims. (Cl. 188—152)

This invention relates to brakes and, in particular, to a brake specially adapted for automotive application.

Conventional hydraulic brakes as now widely employed, comprise a pair of pivoted levers, each having a brake shoe secured thereto, and a hydraulic piston and cylinder for forcing the levers outward until the brake shoes engage the interior of the brake drum. Extensive use of this brake has continued despite numerous serious objections thereto. The cost of such construction, for example, is relatively high, largely because of the number of parts required. The area of contact between the brake shoes and the brake drum is limited, because of the pivotal movement of the levers and the relatively small dimension of the shoes circumferentially. In addition, the possibility of leakage of the actuating fluid is always present since there must be a sliding fit between the piston and cylinder which requires packing.

I have invented a novel form of brake which overcomes the aforementioned objections and is characterized by other novel features and advantages. In a preferred form, my invention comprises an annular expansible chamber mounted on a suitable support and provided on its periphery with a braking surface adapted to have frictional contact with the interior of a brake drum. The construction of the annular chamber is such that when fluid under pressure is admitted thereto, radial expansion results whereby the brake shoes engage the drum and exert a strong braking effect thereon which is uniform at all points around the circumference of the chamber. The construction of the brake is simple and relatively inexpensive. Maintenance problems are practically nil since the brake is both self-equalizing and self-adjusting.

The following detailed description and explanation refers to the accompanying drawing illustrating a preferred embodiment of the invention. In the drawing, Fig. 1 is an axial section through an automobile wheel having the invention incorporated therein, parts being shown in elevation;

Figure 2:
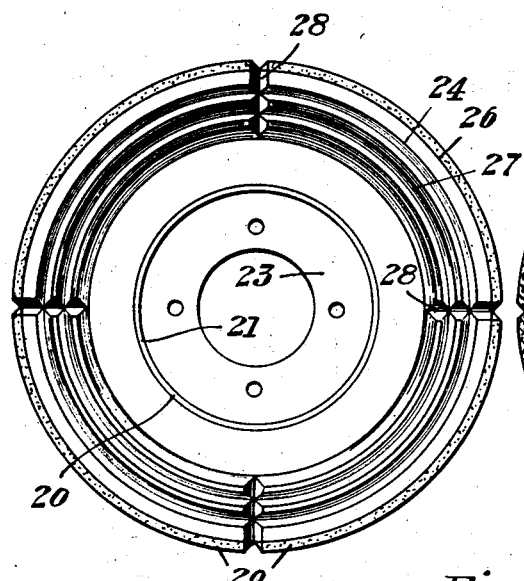
Fig. 2 is a side elevation of the annular chamber and its support.
Figure 3:
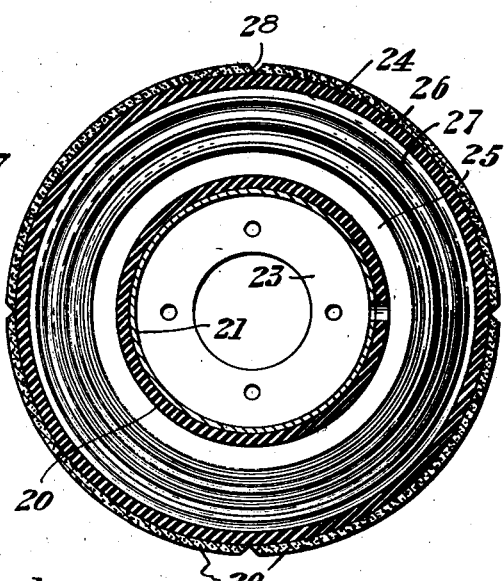
Fig. 3 is a sectional view through the chamber and its support only, taken along the plane of line III—III of Fig. 1.
Figure 1:
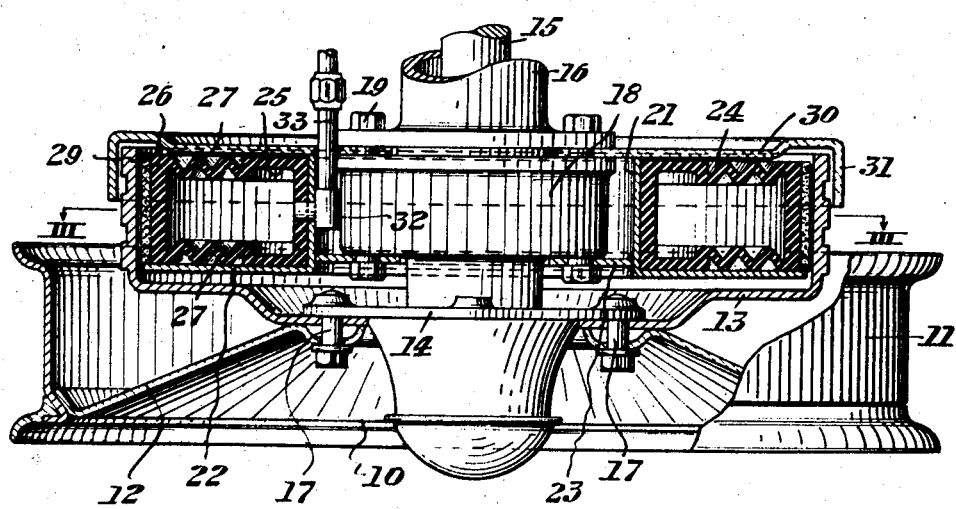

Referring now in detail to the drawing, the brake of my invention is intended particularly for use on automobile wheels such as that indicated generally at 10 and including a rim 11, a disc 12 and a brake drum 13 secured together by any convenient means such as welding, and adapted to be secured to a driving flange 14, in the case of the rear wheel of an automobile having a conventional drive. The flange 14 is secured to the rear axle 15 enclosed within the housing 16. The wheel is removably secured to the flange 14 by bolts 17.

A housing 18 secured to the outer end of the housing 16 by bolts 19 encloses antifriction bearings for the rear axle 15. A supporting member 20 for the brake to be described shortly includes a cylindrical portion 21, a flange or disc 22 extending outwardly therefrom, and a hub portion 23. The support 20 is secured to the housing 18 by the bolts 19 which pass through holes in the hub portion 23 thereof.

An annular expansible chamber 24 is carried on the supporting member 20. The chamber 24 is preferably molded from rubber of suitable character, reinforced with fabric or like material. The chamber comprises an inner ring or portion of channel section indicated generally at 25 and an outer ring or rim 26, connected by annular side walls 27 of corrugated, ribbed or pleated character. The inner ring is preferably molded on the supporting member so that it is firmly bonded to the cylindrical portion 21 and flange 22 of the supporting member 20, whereby the chamber and its support, in effect, constitute a one-piece, integral structure. The member 20 may be of hard rubber or molded plastic material, instead of metal as shown. A mechanical interlocking between these parts may also be employed if desired by suitably shaping the contacting surfaces of the ring and support.

The outer ring 26 and side walls 27 are preferably made in sections and connected by pleats 28 to permit radial expansion thereof on admission of fluid under pressure to the interior of the chamber 24. A like result may also be obtained by simply forming breaks or grooves in the ring and side walls as also indicated at 28.

Brake shoes 29 are secured to the periphery of the chamber 24 and overlie substantially the entire circumference thereof. The shoes may be secured to the chamber in any convenient manner. Preferably, the chamber is vulcanized to the shoes, forming a permanent bond therebetween. Instead of using separately formed brake shoes, frictional material may be incorporated in the outer ring 26 and the latter can be molded from material adapted to provide a braking surface in itself. When so made, the braking surface, the expansible chamber and the supporting member become an integral structure.

A closure disc 30 extends outwardly from the housing 16 and has its edge flanged over as at 31 to partially enclose the brake drum 13. A fitting 32 communicates with the interior of the chamber 24. The fitting may conveniently be threaded through the wall of the cylindrical portion 21 of the support 20. A connection 33 extends from the fitting 32 to a source of fluid under pressure which may conveniently be similar to that now provided on automobiles having hydraulic brakes.

The chamber 24 is so dimensioned that a slight clearance exists between the shoes 29 and the drum 13 when there is no pressure being applied to the fluid in the system. Immediately on the application of pressure, the shoes are forced outwardly into contact with the interior of the drum 13. The shoes preferably have a curvature identical with that of the drum so that intimate frictional contact therebetween is obtained at all points. The length of the shoes circumferentially furthermore, is such that contact between them and the drum is had throughout substantially the entire periphery of the latter, thus providing a braking surface much greater than that which is available in brakes of conventional construction. This means, of course, that the same braking effect can be obtained with the brake of my invention by a lower pedal pressure than is required in conventional braking systems.

The operation of the brake is extremely simple. As stated, the chamber 24 is so designed that in its normal, i. e., not expanded, condition, the shoes 29 are spaced slightly from the interior of the drum 13. On admission of fluid under pressure to the chamber 24 through the connection 33, radial expansion of the chamber occurs, forcing the shoes 29 firmly into contact with the drum.

Since pressure applied to an enclosed fluid is transmitted equally in all directions, the pressure exerted by the shoes 29 on the drum will be uniform throughout the circumference of the latter. The flange 24 and closure plate 30 prevent any substantial enlargement of the chamber 24 axially. As just indicated, the brake of my invention, by reason of its construction, is self-equalizing, i. e., each unit area of brake shoe surface exerts the same braking force on the brake drum as all other unit areas. Should one brake shoe wear more than the others, furthermore, this uneven wear is compensated automatically by greater radial movement of the shoe which is subject to the greatest wear. Because of the large area of contact between the brake shoes and drum, however, the shoes have a very long useful life as the pressure between the shoes and drum is much less than in ordinary braking systems. For this reason, the necessity for adjusting the brake when in service is practically eliminated.

It will be apparent from the foregoing description and explanation that the brake of my invention is characterized by numerous advantages over brakes which have been known heretofore. In the first place, the invention provides a brake of extremely simple and relatively inexpensive construction which is more positive in action and has a longer life than the brakes of known construction. The invention may be applied to automobiles in use, since it occupies the same space as the conventional brake actuating mechanism. The cost of the annular chamber, its support and the brake shoes is such that after the brakes have been worn out, the entire unit can be replaced so cheaply that there would be no reason to attempt to place new shoes on the old chamber.

The fluid system does not include any packed joints such as are present in the ordinary piston and cylinder actuator, so that there is no leakage of actuating fluid.

The brake may be designed for actuation by any fluid available, e. g., air or some liquid to which the material of which the chamber is composed is impervious.

The invention is applicable not only to automotive vehicles but to other types such as airplanes or the like. It is particularly desirable for the latter since it produces an even braking effect without slippage and has a minimum number of parts subject to failure.

Although I have illustrated and described a preferred form of the invention, it will be understood that changes in the construction disclosed may be made without departing from the spirit of the invention or the scope of the appended claims.

I claim:

1. A brake comprising an inner ring, an outer ring and ribbed side walls connecting said rings and defining therewith an annular expansible chamber, a support engaging the inner ring, and a braking surface on the exterior of said outer ring, said side walls being grooved radially and said outer ring axially to permit radial expansion thereof.

2. A brake comprising an annular, expansible chamber including an inner ring of substantially channel section, an outer ring and corrugated walls joining said rings, said walls having radial pleats whereby they may expand and contract radially, and a braking surface formed on the exterior of said outer ring.

3. A brake comprising an inner ring, an outer ring and ribbed side walls connecting said rings and defining therewith an annular expansible chamber, a support engaging the inner ring, and brake shoes disposed end to end around the exterior of said outer ring, said side walls and outer ring having pleats to permit expansion and contraction thereof.

4. A brake comprising an annular, expansible chamber including an inner ring, an outer ring, corrugated walls joining said rings, said walls and outer ring having pleats whereby they may expand and contract, a support on which one of said rings is mounted and a braking surface carried on the other ring.

DAVID HOPPENSTAND.